United States Patent [19]
Jost

[11] Patent Number: 6,119,537
[45] Date of Patent: Sep. 19, 2000

[54] METHOD AND APPARATUS FOR ROTARY MOTION TRANSFER INTO AN ISOLATED REGION

[75] Inventor: Georg Jost, Munich, Germany

[73] Assignee: Applied Materials, Inc., Santa Clara, Calif.

[21] Appl. No.: 09/128,105

[22] Filed: Aug. 3, 1998

[51] Int. Cl.[7] .................................................. F16J 15/50
[52] U.S. Cl. ............................................. 74/18.1; 464/88
[58] Field of Search .................................... 277/634, 636;
464/182, 106, 109, 147, 149, 153, 87, 88, 93; 475/163; 74/18.1, 63

[56] References Cited

U.S. PATENT DOCUMENTS

| | | | |
|---|---|---|---|
| 3,720,076 | 3/1973 | Nordin | 464/88 |
| 4,550,630 | 11/1985 | Remus | 74/18.1 X |
| 4,683,763 | 8/1987 | Balter . | |
| 4,885,946 | 12/1989 | Balter . | |
| 5,113,102 | 5/1992 | Gilmore . | |

FOREIGN PATENT DOCUMENTS 856530  3/1959  United Kingdom .................... 74/18.1

OTHER PUBLICATIONS

IBS Magnet data sheet titled "Dauermagnet–Stirndrehkupplung".

Primary Examiner—David A. Bucci
Assistant Examiner—Colby Hansen
Attorney, Agent, or Firm—Valerie Dugan

[57] ABSTRACT

An apparatus is provided for transferring rotary motion into an isolated region. The apparatus includes first and second angled drive shafts each coupled to an opposite side of a collar via one or more bearings. A flexible seal is coupled between the collar and an isolated region (e.g., a process chamber) forming a first stage isolation region. The second shaft extends from the collar through the first stage isolation region into the process chamber. The first shaft extends through an end plate to the collar. An anti-rotation element is coupled between the collar and the end plate. As the first angled shaft rotates the collar wobbles causing the second shaft to rotate within the process chamber. Rotational forces which may be imparted from the shaft to the collar are opposed by friction induced between the collar and the end plate by the anti-rotation element. Thus, the collar will not rotate and the flexible seal will not twist. Accordingly the flexible seal may be made of an inexpensive material as it functions merely for isolation, and need not be configured to obstruct the collar's rotation.

20 Claims, 12 Drawing Sheets

METHOD AND APPARATUS FOR ROTARY MOTION TRANSFER INTO AN ISOLATED REGION

BACKGROUND OF THE INVENTION

The present invention relates to mechanisms for transferring motion into an isolated region while maintaining the isolation thereof (i.e., isolated transfer), and more particularly to mechanisms that transfer rotary motion into such a region.

In many applications it is desirable to rotate an object located in an isolated region without disturbing the isolated region (e.g., without significantly impacting the isolated region's temperature, pressure, atmospheric content, etc.). For instance, in the semiconductor industry it is often necessary to rotate a wafer located within a vacuum or other processing chamber before, during, and/or after wafer processing. Such rotation may be performed manually (e.g., by an operator of the processing equipment) or automatically (e.g., with a stepper motor or similar apparatus). Absent a mechanism for isolated transfer of motion into an isolated region (e.g., the vacuum chamber), a motor for rotating the wafer must be contained in the, vacuum chamber, or the vacuum chamber must be vented, exposed to the surrounding atmosphere, and the wafer manually rotated. Both approaches are unacceptable in many cases as both expose the wafer to contaminants (either from the motor or from the atmosphere surrounding the vacuum chamber), and the later significantly increases wafer processing time.

In addition to the contamination concerns of the semiconductor industry, the semiconductor industry and many other industries (e.g., robotics, lamp manufacturing, aerospace/defense, fiber optic manufacturing, chemical/hydrocarbon processing, and the like), often require rotary motion within an isolated region containing toxic or otherwise environmentally hazardous gases/chemicals, high or low temperatures, or other similar conditions that mandate isolation.

For all the above situations, and in many others, a mechanism for isolated transfer of rotary motion into an isolated region (i.e., a rotary feedthrough) is required. Typically, rotary feedthroughs include a first stage isolation region which is coupled to the isolated region (e.g., to the process chamber). A first rotatable shaft is located outside the first stage isolation region and operatively couples to a second rotatable shaft located within the first stage isolation region. The second shaft extends from the first stage isolation region into the isolation region. The first and second rotatable shafts are coupled so that rotation of the first shaft outside the first stage isolation region rotates the second rotatable shaft inside the first stage isolation region (and thus rotates the portion of the second shaft which extends into the isolated region). Some mechanism is provided for coupling the two shafts in an isolated manner (i.e., such that no fluid passageway exists between the first stage isolation region and a region external thereto).

One conventional rotary feedthrough configuration employs magnetic coupling as shown in Gilmore U.S. Pat. No. 5,113,102. Specifically, an air tight housing is attached to the isolated region (e.g., a vacuum chamber) so that the housing and the isolated region are in fluid communication. The housing contains permanent magnets rigidly attached to a shaft which extends from the housing into the isolated region. Instead of employing a first shaft outside the isolated region and a second shaft inside the isolated region, only one shaft is employed which extends from the housing into the isolated region. To rotate the shaft within the isolated region a stator winding surrounds the exterior surface of the housing. The stator winding generates a magnetic field that causes the permanent magnets within the housing to rotate, which in turn rotates the shaft within the isolated region. The stator winding and permanent magnets thus form a brushless electric motor, and rotation of the shaft within the isolated region is controllable from outside the isolated region.

Because magnetic materials are temperature sensitive (e.g., subject to a phase transition at the Curie temperature which renders the magnetic materials non-magnetic or significantly less magnetic), most magnetically coupled rotary feedthroughs cannot operate above about 220° C., making such feedthroughs impractical for many semiconductor processing applications. Furthermore, magnetic coupling is not sufficiently strong to support the high torque levels required of many rotary feedthroughs. Magnetic materials are also very sensitive to radiation and to hydrogen and, for reliable rotary feedthrough operation, must be protected from environments containing either radioactive materials or hydrogen. Accordingly magnetically coupled rotary feedthroughs are not suitable for high temperature, high torque, radioactive or certain chemical environments.

An alternative rotary feedthrough configuration that employs mechanical rather than magnetic coupling is shown in Balter U.S. Pat. No. 4,683,763. FIG. 1 is a side elevational view of such a conventional mechanically coupled rotary feedthrough (represented as conventional rotary feedthrough 11). The conventional rotary feedthrough 11 comprises a collar 13 and a housing 15 which surrounds the collar 13. The housing 15 has a first housing end 15a through which a first rotary shaft 17 rotatably passes (i.e., such that the first shaft may rotate with respect to the first housing end 15a) and rotatably couples to the collar 13, and a second housing end 15b through which a second rotary shaft 19 rotatably passes and rotatably couples to the collar 13. The first rotary shaft 17 has an enlarged slanted end 21 and is rotatably coupled to the first housing end 15a via first housing end bearings 23 and to the collar 13 via enlarged slanted end bearings 25. The second rotary shaft 19 has a reduced slanted portion 27 and is rotatably coupled to the second housing end 15b via second housing end bearing 29 and to the collar 13 via reduced slanted portion bearings 31.

A bellows 33 is coupled between the second housing end 15b and the collar 13 to form a first stage isolation region 35. A second stage isolation region such as a vacuum chamber 37 can be coupled to the conventional rotary feedthrough 11 as shown in FIG. 1. Note the region within the bellows 33 is referred to herein as a first stage isolation region because this region is isolated from the rest of the housing and because a fluid path may or may not exist along the second rotary shaft 19 between the first stage isolation region 35 and the vacuum chamber 37.

To connect the conventional rotary feedthrough 11 to the vacuum chamber 37, the housing 15 is sealingly attached (e.g., forming an air tight seal) to the vacuum chamber 37 via bolt holes 39a, 39b. The second rotary shaft 19 extends into the vacuum chamber 37.

In operation, the first rotary shaft 17 is rotated manually or via a motor, causing the collar 13 (which is coupled to the enlarged slanted end 21 of the first rotary shaft 17) to move in a circular arcing motion. The enlarged slanted end bearings 25 which couple the collar 13 to the first rotary shaft 17 isolate the collar 13 from a portion of the rotary force exerted by the first rotary shaft 17. Nonetheless, the circular arcing motion of the collar 13 causes the second rotary shaft 19, which is coupled to the collar 13, to rotate. Rotary motion is thereby transferred from the first rotary shaft 17 to the second rotary shaft 19 in an isolated manner.

Because the enlarged slanted end bearings 25 and the reduced slanted portion bearings 31 are imperfect, the rotary motion of the first and second rotary shafts 17, 19 exerts a rotary force on the collar 13. In response to this rotary force the collar 13 attempts to rotate. However, because the bellows 33 is rigidly attached to both the collar 13 and the second end plate 15b, rotation of the collar 13 would twist the bellows 33 and thus would interfere with the bellow's operation. Accordingly, the bellows 33 may detach from either the collar 13 or the second end plate 15b, or otherwise fail. Thus, in order to prevent rotation of the collar 13 the bellows 33 of U.S. Pat. No. 4,683,763 presumably must be fabricated from a semi-rigid material (such as a metal) that can withstand the rotary force applied to the bellows due to rotation of the first and secondary rotary shafts 17, 19.

Accordingly, while conventional mechanically coupled rotary feedthroughs are less sensitive to elevated temperatures than are magnetically coupled feedthroughs, conventional mechanically coupled rotary feedthroughs are still unsuitable for high torque applications. That is, because the bearings used in such feedthroughs are imperfect, when a high torque is exerted on the first rotary shaft 17, a significant torque may be transferred to the bellows 33 via the collar 13, straining the bellows 33 and subjecting it to wear during normal use.

Accordingly, conventional mechanically coupled rotary feed-through designs require the use of more expensive, semi-rigid bellows in order to prevent the collar 13 from rotating. The semi-rigid bellows thus are exposed to repeated strain which in turn shortens the bellow's life. Additionally, such conventional, metal, semi-rigid bellows are incompatible with many chemical environments (e.g., hydrofluoric acid, etc.).

Thus a need exists for an improved and cost-effective method and apparatus for transmitting rotary motion into an isolated region under normal, as well as high torque, high temperature or chemically reactive conditions.

SUMMARY OF THE INVENTION

The present invention provides a cost effective mechanism for isolatedly transferring rotary motion into an isolated region (e.g., a rotary feedthrough). The inventive rotary feedthrough is specially designed to minimize stress applied to the rotary feedthrough's flexible seal (e.g., the bellows). Accordingly, because the flexible seal is exposed to less stress, the seal may be made of less expensive material. The inventive rotary feedthrough is designed such that the rotary feedthrough's seal functions only to maintain isolation between two regions, rather than to deter rotation of the rotary feedthrough's collar.

The rotary feedthrough of the present invention comprises a collar, a first end plate positioned a distance from (i.e., distant to) the collar in a first direction, and a first shaft that extends through the first end plate and couples to the collar such that the first shaft may rotate with respect to the collar (i.e., is rotatably coupled to the collar). The inventive rotary feedthrough further comprises a second end plate distant to the collar in a second direction, a second shaft that extends through the second end plate and rotatably couples to the collar, and a flexible seal that sealingly couples to the collar and to at least one of the first and second end plates. An anti-rotation element is operatively coupled between the collar and the first end plate so that in operation the anti-rotation element engages both the collar and the first end plate and thus at least partially obstructs rotation of the collar. It will be understood that as used herein, the term anti-rotation element does not include a mechanism that isolates one region from another (e.g., a bellows).

The anti-rotation element preferably comprises a frictional material such as a rubber ring that surrounds the first shaft. The anti-rotation element may be a single piece mounted on either the first end plate or the collar, or preferably may comprise two pieces, a first piece mounted to the collar and a second piece mounted to the first end plate. The first and second pieces preferably comprise cog-gears.

In operation, as either the first or second shaft rotates, rotative forces are applied to the collar. However, these rotative forces are counteracted by frictional forces between the collar, the anti-rotation element, and the first end plate. The friction generated by the anti-rotation element's engagement with the collar and with the first end plate limits rotation of the collar. The flexible seal is therefore able to function purely as an isolation mechanism, without requiring the structural rigidity otherwise needed to oppose the rotation of the collar.

Other objects, features and advantages of the present invention will become more fully apparent from the following detailed description of the preferred embodiments, the appended claims and the accompanying drawings.

DETAILED DESCRIPTION OF THE PREFERRED EMBODIMENTS

Figure 1:
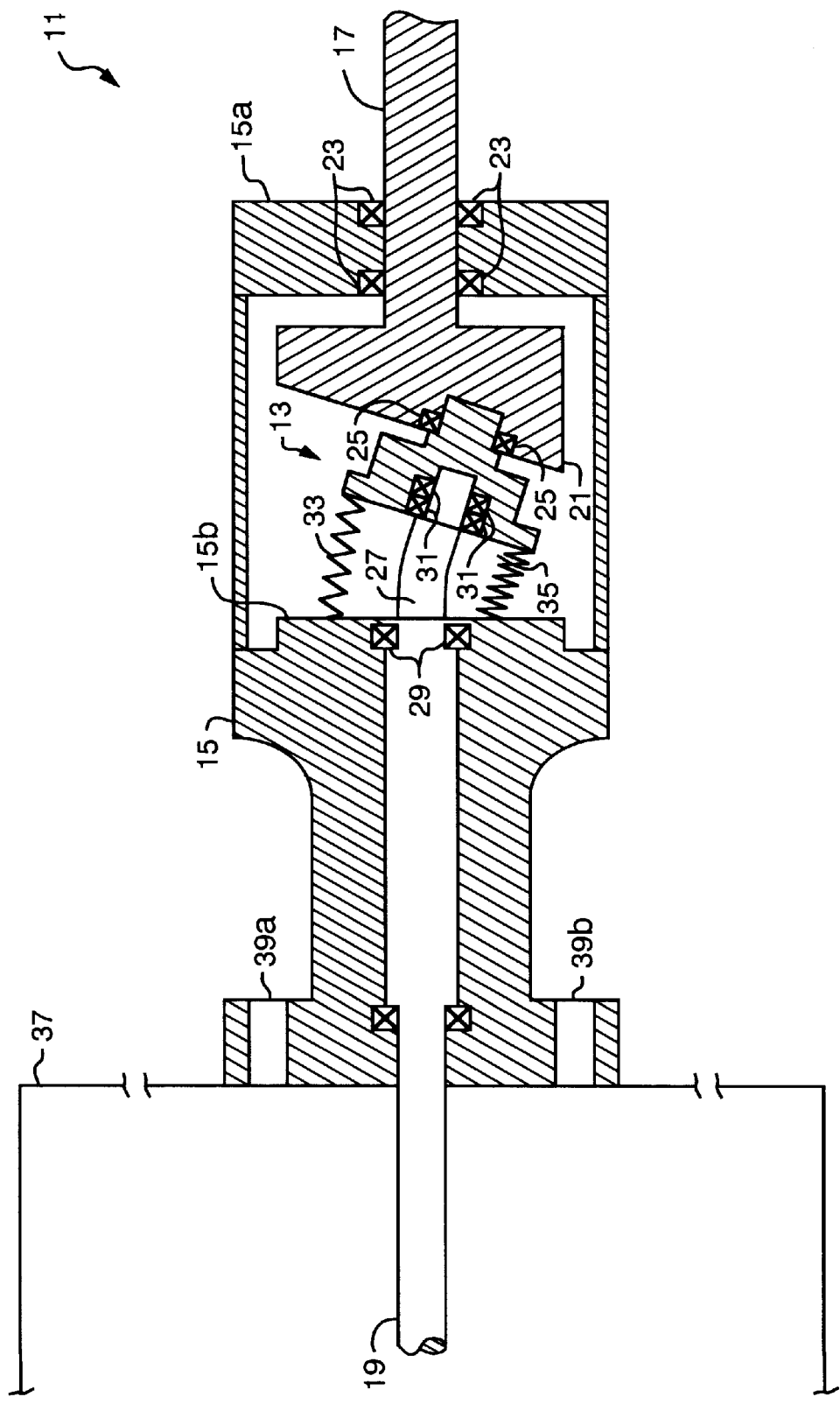
FIG. 1 is a side elevational view of a conventional rotary feedthrough as previously described.
Figure 2A:
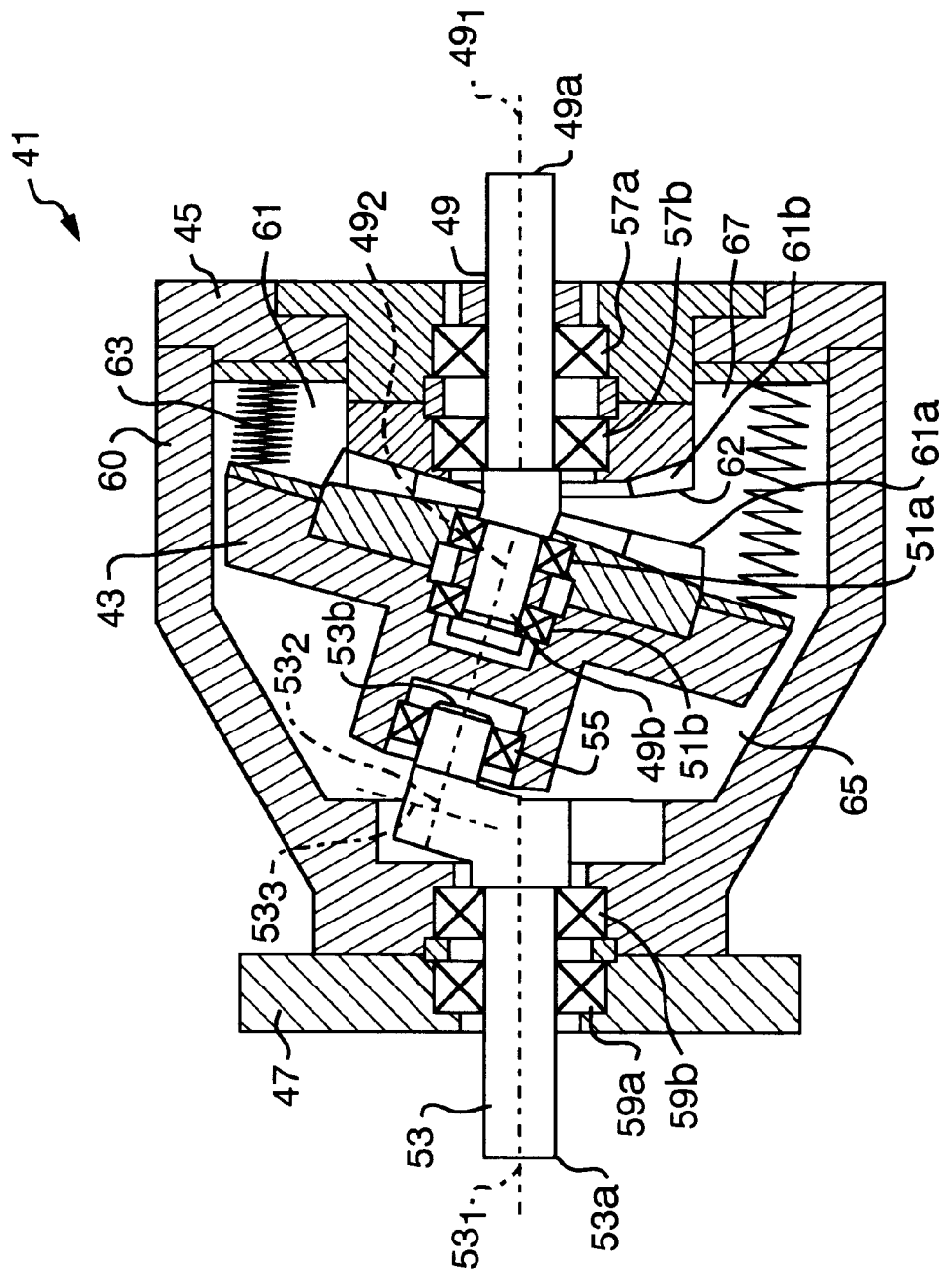
FIG. 2A is a side elevational view of an inventive rotary feedthrough.

FIG. 2A is a side elevational view of an inventive rotary feedthrough 41. The inventive rotary feedthrough 41 comprises a collar 43, a first end plate 45 distantly located from the collar 43 in a first direction, and a second end plate 47 distantly located from the collar 43 in a second direction. A first shaft 49, having a first end 49a and a second end 49b, extends through the first end plate 45 and rotatably couples to the collar 43, such that the first end 49a of the first shaft 49 extends beyond the first end plate 45 in the first direction and the second end 49b of the first shaft 49 rotatably couples to the collar 43 via a first pair of bearings 51a, 51b. Similarly a second shaft 53 having a first end 53a and a second end 53b extends through the second end plate 47 and rotatably couples to the collar 43, such that the first end 53a of the second shaft 53 extends beyond the second end plate 47 in the second direction and the second end 53b of the second shaft 53 rotatably couples to the collar 43 via a second bearing 55. As the first shaft 49 passes through the first end plate 45 it rotatably couples thereto via a second pair of bearings 57a, 57b, and as the second shaft 53 passes through the second end plate 47 it couples thereto via a third pair of bearings 59a, 59b.

In a preferred embodiment a housing 60, extends between the first end plate 45 and the second end plate 47 so as to enclose the collar 43. The housing may be coupled to the first end plate 45 and to the second end plate 47 or may be integral to the first end plate 45 and/or the second end plate 47.

An anti-rotation element 61 is coupled between the collar 43 and the first end plate 45 so that, in operation, the anti-rotation element 61 contacts both the collar 43 and the first end plate 45 (i.e., the anti-rotation element 61 is engagingly coupled between the collar 43 and the first end plate 45). The contact between the collar 43 and the first end plate 45 at least partially obstructs rotation of the collar 43.

Figure 3A:
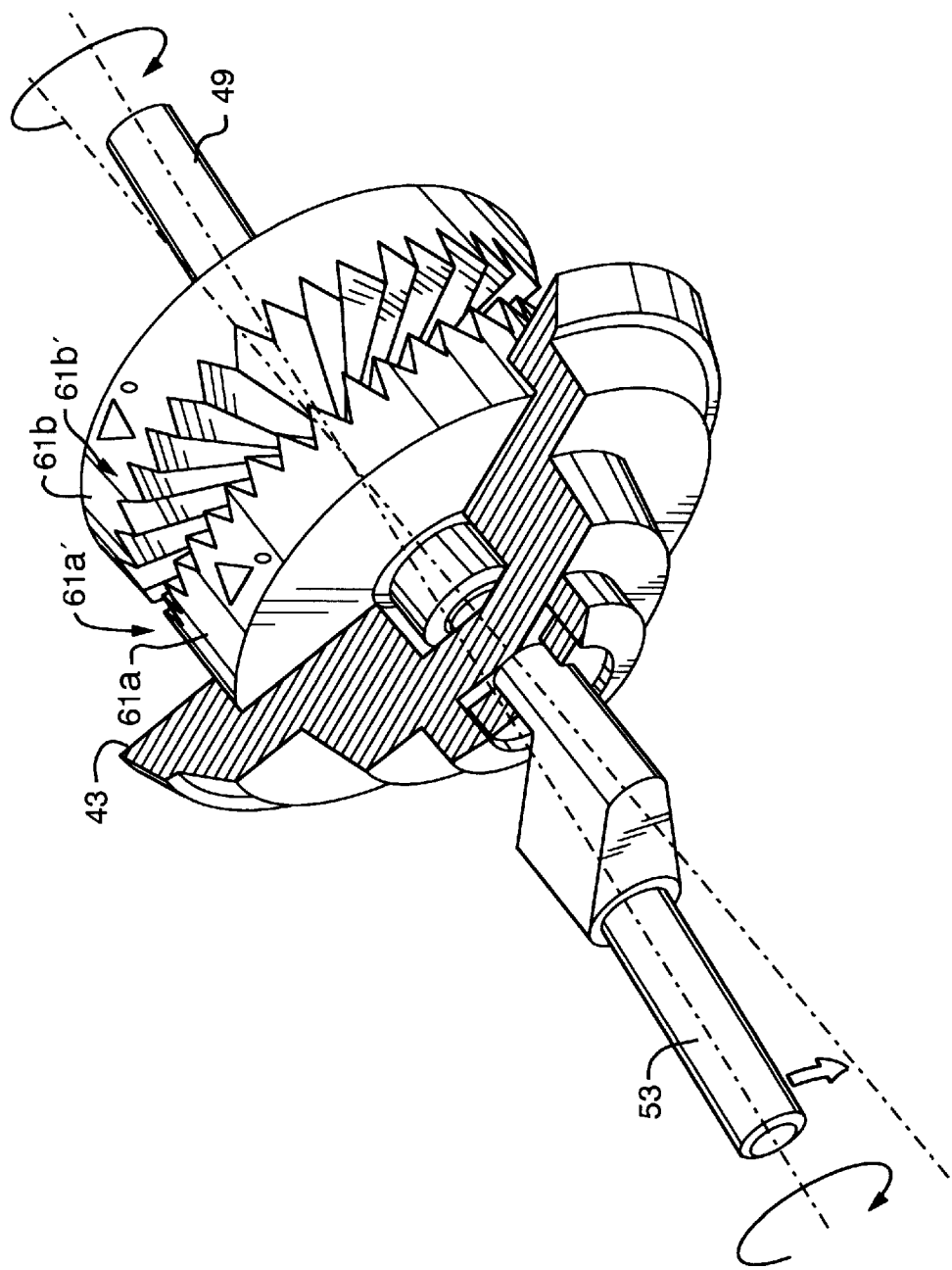
FIGS. 3A–3C are perspective views of the relative position of the anti-rotation element of the rotary feedthrough of FIG. 2A during rotation of the first and second shafts.
Figure 3B:
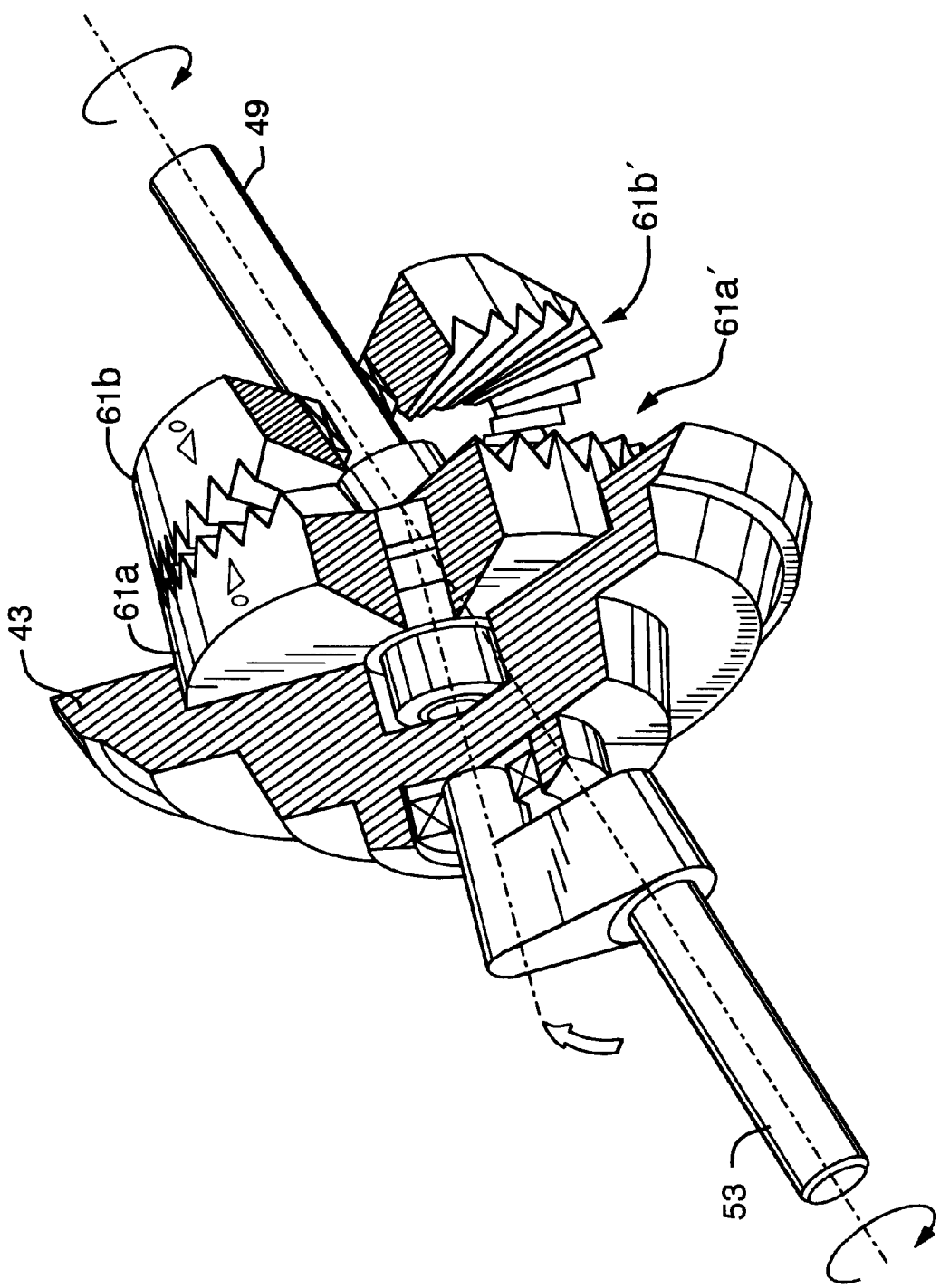
Figure 3C:
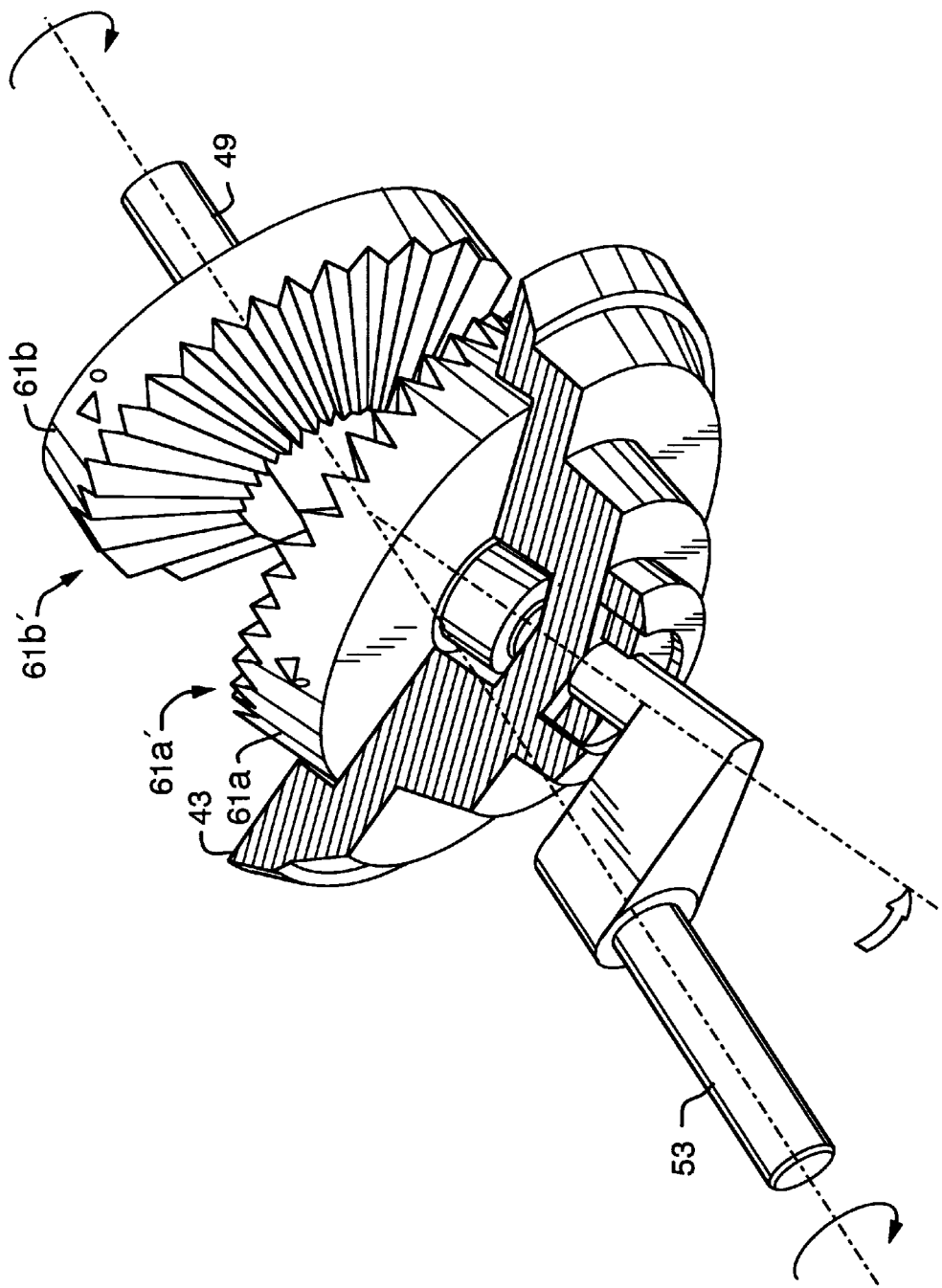

It is preferred that the anti-rotation element 61 substantially obstructs rotation of the collar 43, and most preferred that the anti-rotation element 61 eliminates rotation of the collar 43. To this end, the anti-rotation element 61 preferably comprises two parts, a first part 61a coupled to the collar 43 and a second part 61b coupled to the first end plate 45. Both parts of the anti-rotation element 61 preferably comprise a frictional material (e.g., rubber) such that the friction therebetween opposes rotation of the collar 43 and/or comprise cog-gears having teeth 61a', 61b' as shown in FIGS. 3A–3C. An outer edge 62 of the second part 61b of the anti-rotation element 61 is preferably beveled so as to maximize surface area contact and thus maximize friction between the first and second parts 61a, 61b of the anti-rotation element 61. Perspective views of the relative position of the first and second parts 61a, 61b during rotation of the first and second shafts 49, 53 are shown in FIGS. 3A–3C, respectively.

At least one of the first shaft 49 and the second shaft 53 is angled so as to cause the collar 43 to wobble during rotary motion transfer, as described in detail with reference to FIGS. 4A–D. Preferably both the first shaft 49 and the second shaft 53 are angled as described with reference to the dashed center lines shown in FIG. 2A, wherein the first shaft 49 comprises first and second center lines $49_1$, $49_2$, respectively, and the second shaft 53 comprises first, second and third center lines $53_1$, $53_2$ and $53_3$, respectively.

Figure 2B:
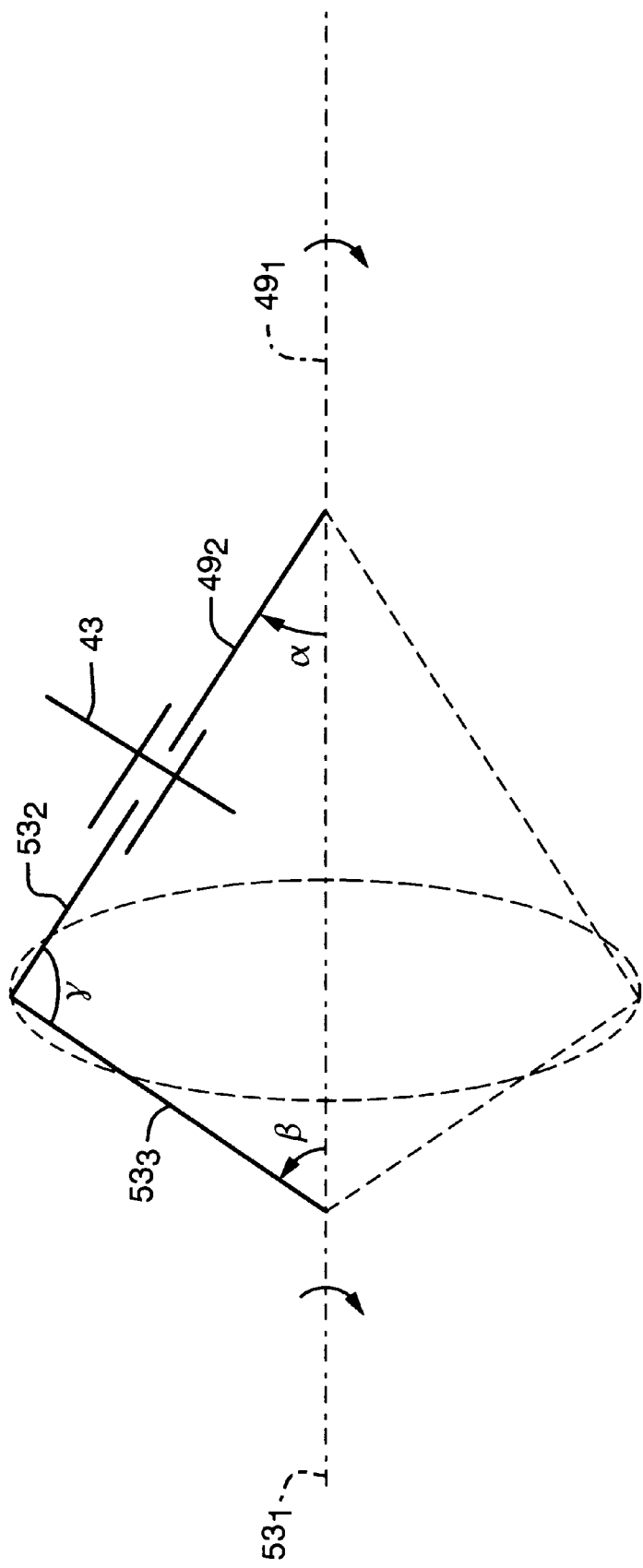
FIG. 2B is a line drawing of the various angles formed by the first and second shafts of the rotary feedthrough of FIG. 2A.

As shown in FIG. 2B, the first and second center lines $49_1$, $49_2$ (and the first and second center lines $53_1$, $53_2$) form a first angle α, the first and third lines $53_1$, $53_3$ form a second angle β, and the second and third lines $53_2$, $53_3$ form a third angle γ. To prevent excessive movement of the collar 43 (and, as described below, the flexible seal 63 coupled thereto) during rotary motion transfer, preferably the first angle α is in the range of 5° to 45°. The first angle α also sets the gearing ratio of the first and second parts 61a, 61b (e.g., 1:1 cog-gearing). Once the first angle α has been selected, the second and third angles β, γ are determined by the desired configuration (e.g., shape) of the second shaft 53 and the geometric constraint α+β+γ=180°.

A flexible seal 63 seals to both the collar 43 and the first end plate 45, forming a first stage isolation region 65. Thus a remaining area 67 within the housing 60 but outside the first stage isolation region 65 may contain gases, liquids or solid particles without contaminating the first stage isolation region 65. Because the motion of the first shaft 49 is transferred to the second shaft 53 via the coupling of the first shaft 49, the collar 43 and the second shaft 53, no passageway exists between the first stage isolation region 65 and remaining area 67. Contamination of the first stage isolation region 65 by contaminants from the remaining area 67 is thus prevented. The operation of the inventive rotary feedthrough 41 is further described with reference to FIGS. 4A–4D which are top plans view thereof.

Figure 4A:
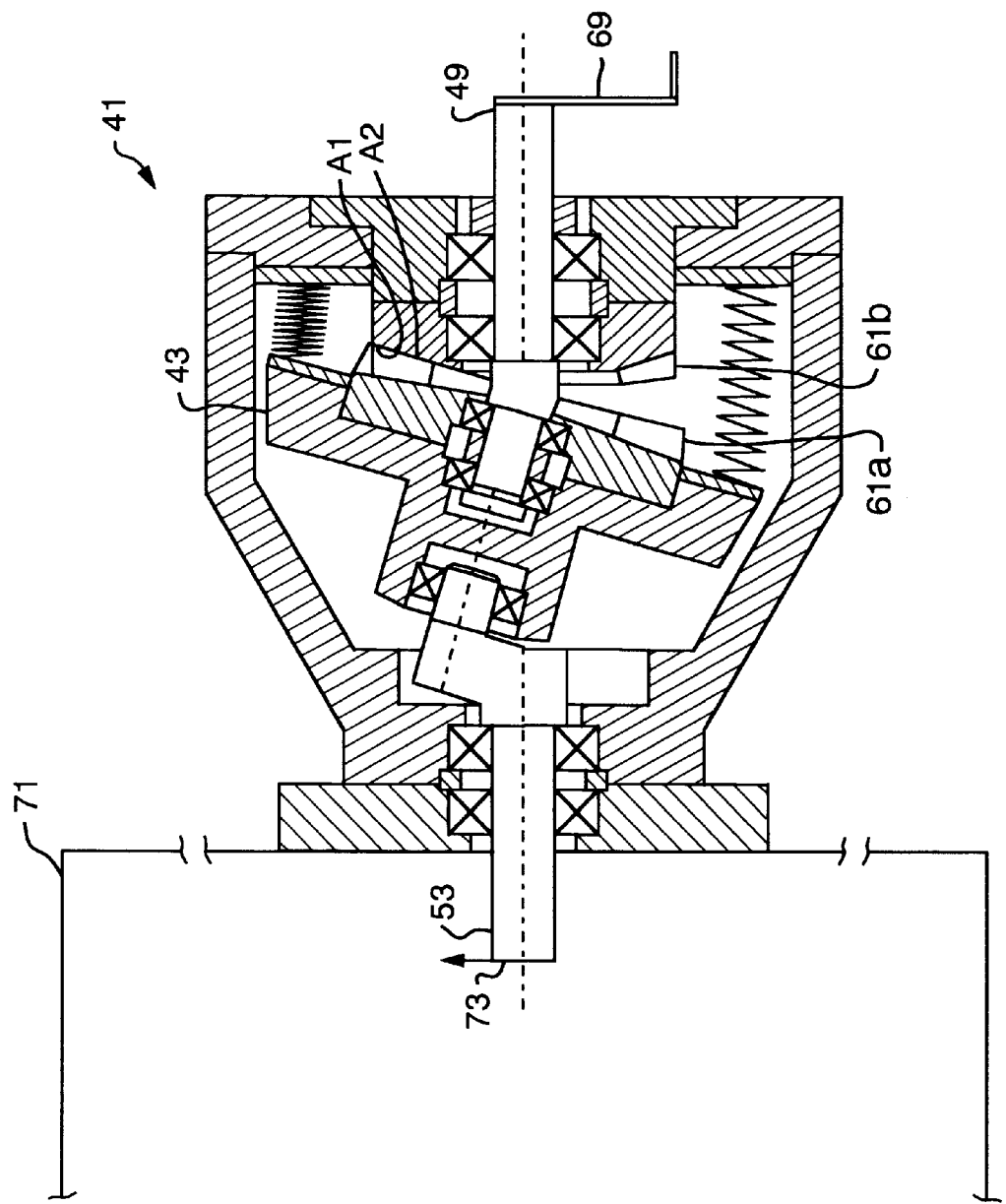
FIGS. 4A–4D are sequential side elevational views of the rotary feedthrough of FIG. 2A, useful in describing a wobbling motion that occurs during operation of the rotary feedthrough.

With reference to FIG. 4A, in operation, a mechanism for rotating the first shaft 49 is provided (e.g., a manual or automatic crank handle 69) and a processing chamber 71 (to which rotary motion is to be transferred) is coupled to the second end plate 47. The second shaft 53 is then coupled to a device within the processing chamber 71 to be rotated (e.g., a semiconductor wafer), represented generally by arrow 73 as shown in FIG. 4A. Initially, a first point A1 on the first anti-rotation element 61a contacts a first point A2 on the second anti-rotation element 61b.

Figure 4B:
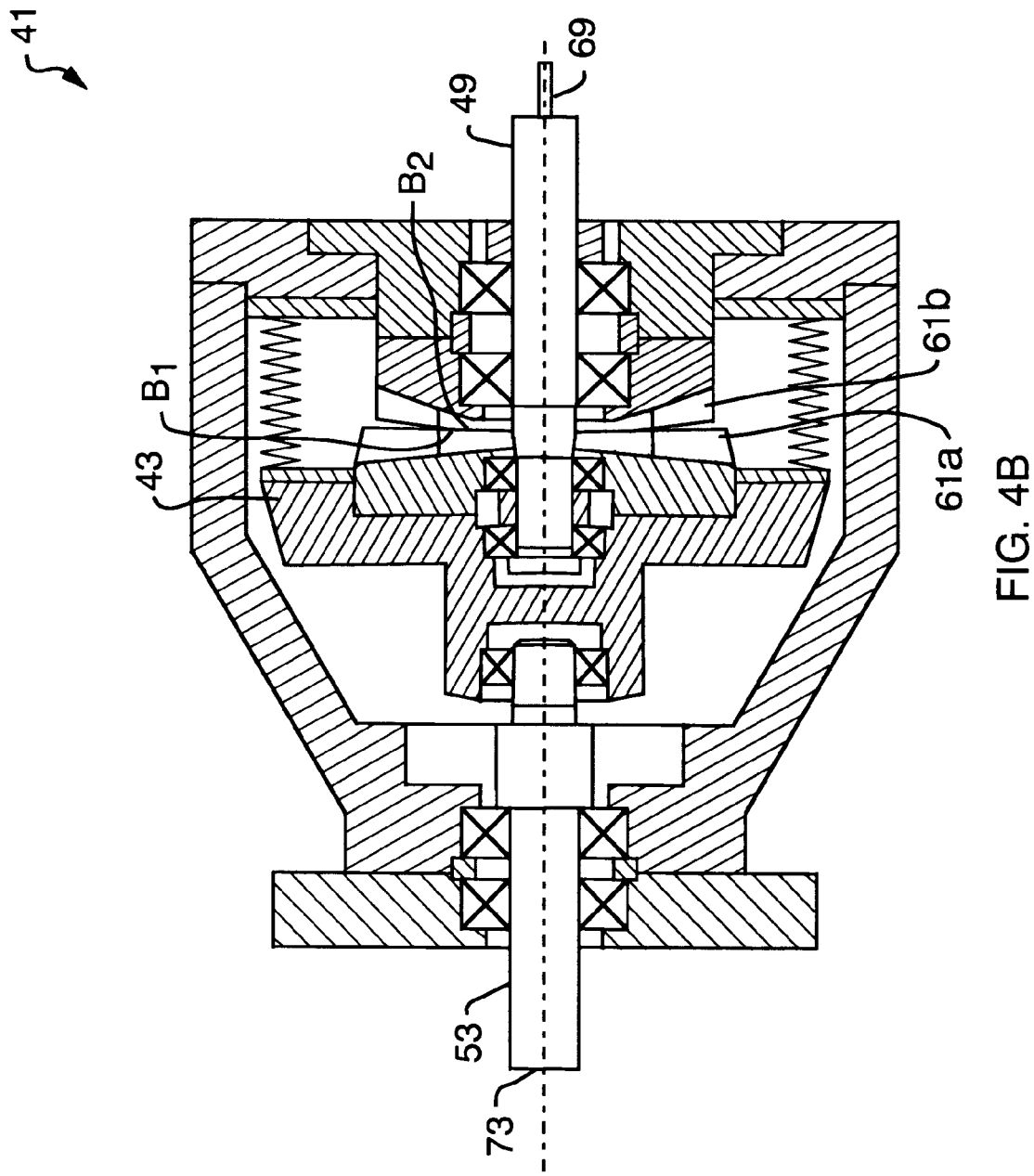

Thereafter, as shown in FIG. 4B, the crank handle 69 is rotated 90° causing the first shaft 49 to rotate. As the first shaft 49 rotates, the point of contact between the first anti-rotation element 61a and the second anti-rotation element 61b also rotates 90° from point A1-2 to points B1-2, respectively. As the crank handle 69 rotates by 90° the first and second parts 61a, 61b of anti-rotation element 61 maintain constant contact along the beveled outer edge 62 of the second part 61b (i.e., the collar and the first part 61a of the anti-rotation element 61 coupled thereto "wobble" by 90° about the second part 61b).

The collar 43 wobbles because it is coupled to the first shaft 49 such that the outer surface of the first part 61a of the anti-rotation element 61 is perpendicular to the second center line $49_2$ of the first shaft 49 and the second center line $53_2$ of the second shaft 53 (FIG. 2A). The wobbling motion of the collar 43 causes the second shaft 53 to rotate in a crank like fashion.

The first pair of bearings 51a, 51b, the second bearing 55, the second pair of bearings 57a, 57b and the third pair of bearings 59a, 59b, allow the first shaft 49 and the second shaft 53 to rotate while exerting a reduced amount of rotational force on the collar 43, on the first end plate 45 and on the second end plate 47, respectively. However, these bearings are unable to completely isolate the collar 43 from the rotary motion of the first shaft 49 and second shaft 53. Accordingly the present invention relies on frictional forces between the first and second parts 61a, 61b of the anti-rotation element 61 to obstruct rotation of the collar 43.

Figure 4C:
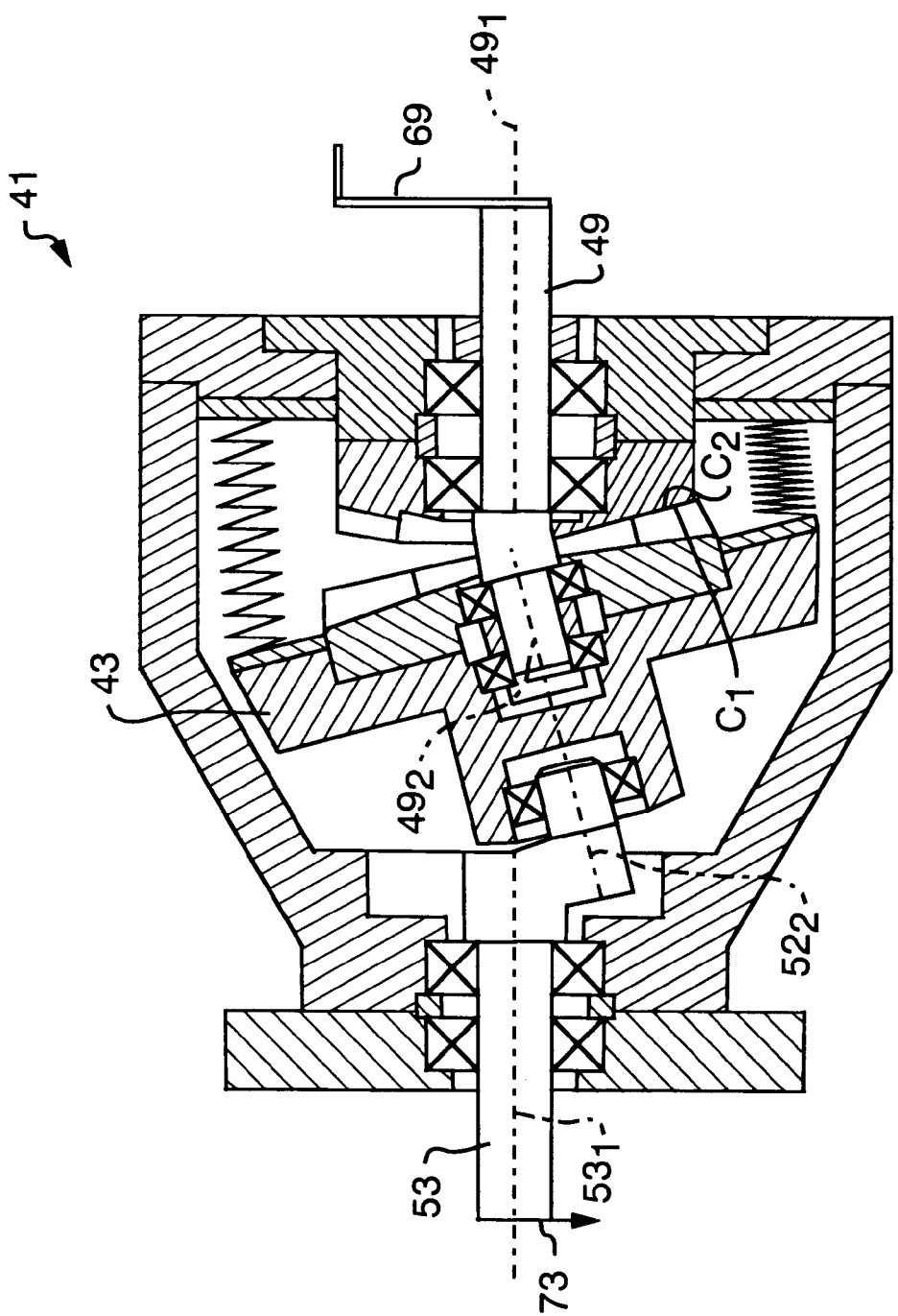
Figure 4D:
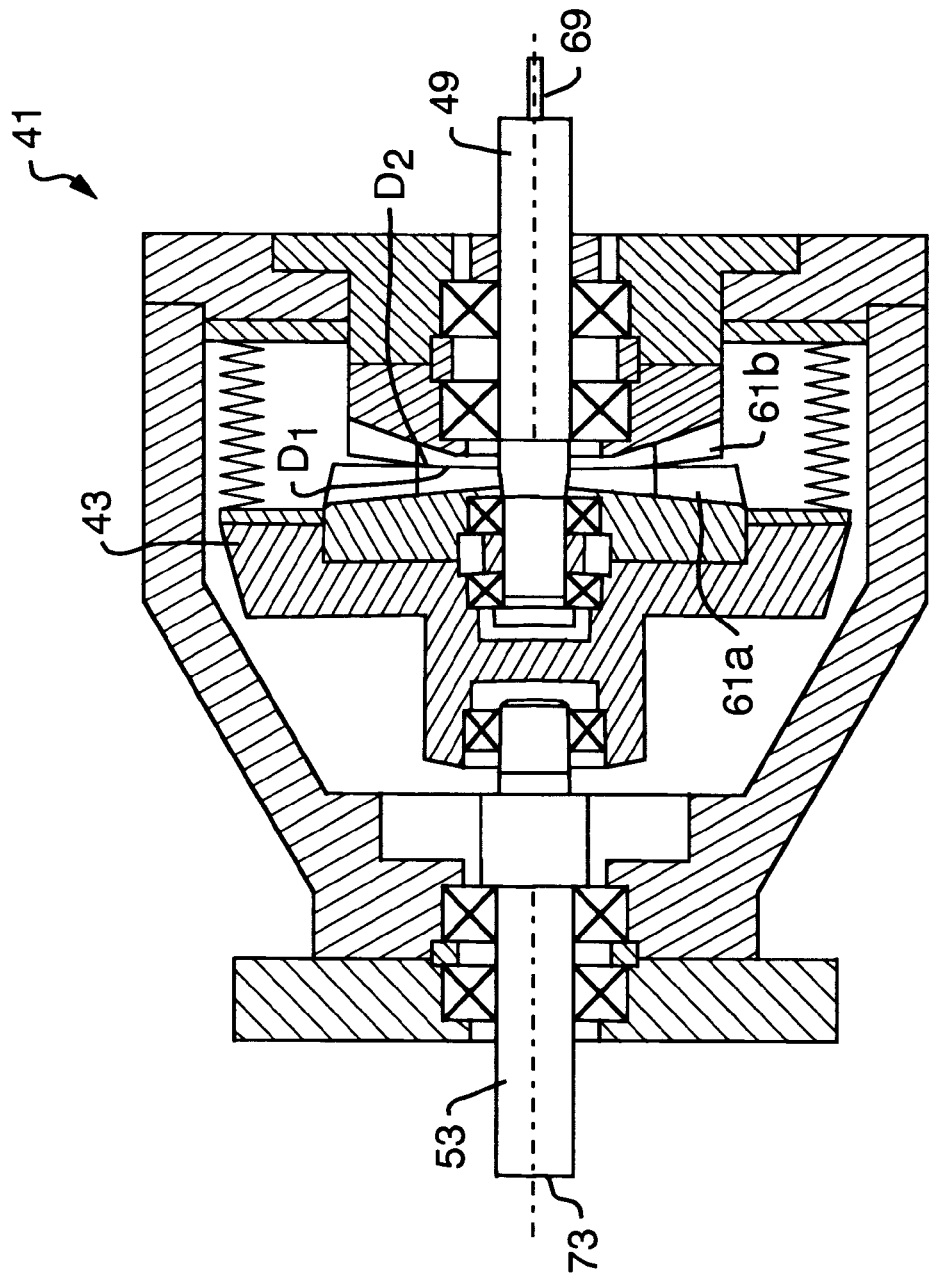

FIGS. 4C–D sequentially show the position of the crank handle 69, the collar 43 and the device 73 as it rotates (90° at a time) through the remainder of a 180° cycle. As shown by FIGS. 4C–D, the first part 61a and the second part 61b of the anti-rotation element 61 maintain continuous contact, although the point of contact rotates from point B1-2 to point C1-2 (FIG. 4C), from point C1-2 to point D1-2 (FIG. 4D), and from point D1-2 back to point A1-2 (FIG. 4A).

Figure 5B:
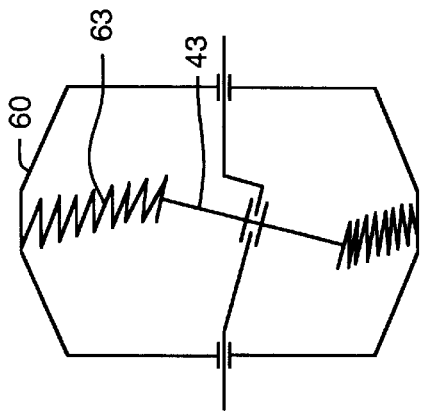
FIGS. 5A–5E are schematic side elevational views of the inventive rotary feedthrough showing alternative configurations for coupling the seal.
Figure 5D:
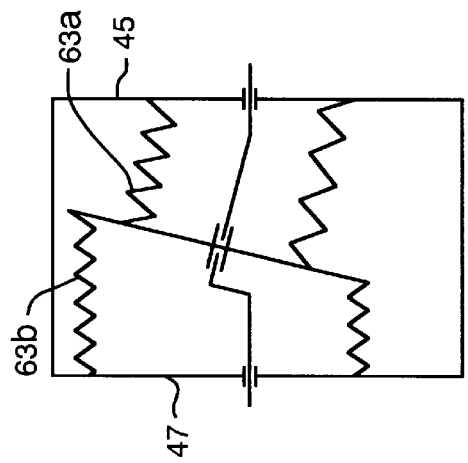
Figure 5A:
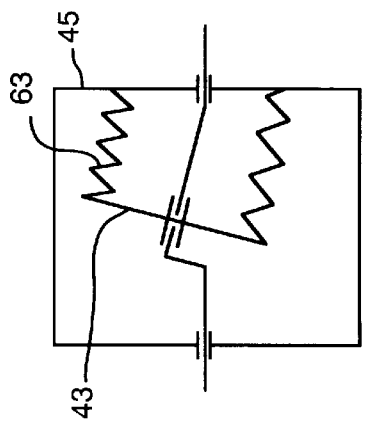
Figure 5C:
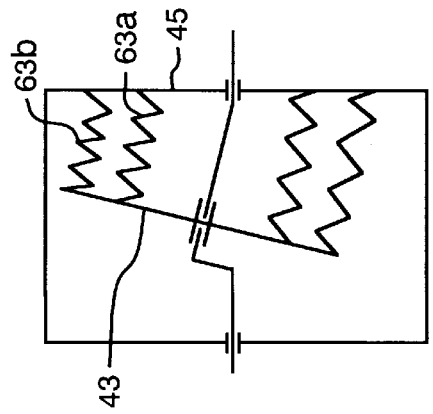
Figure 5E:
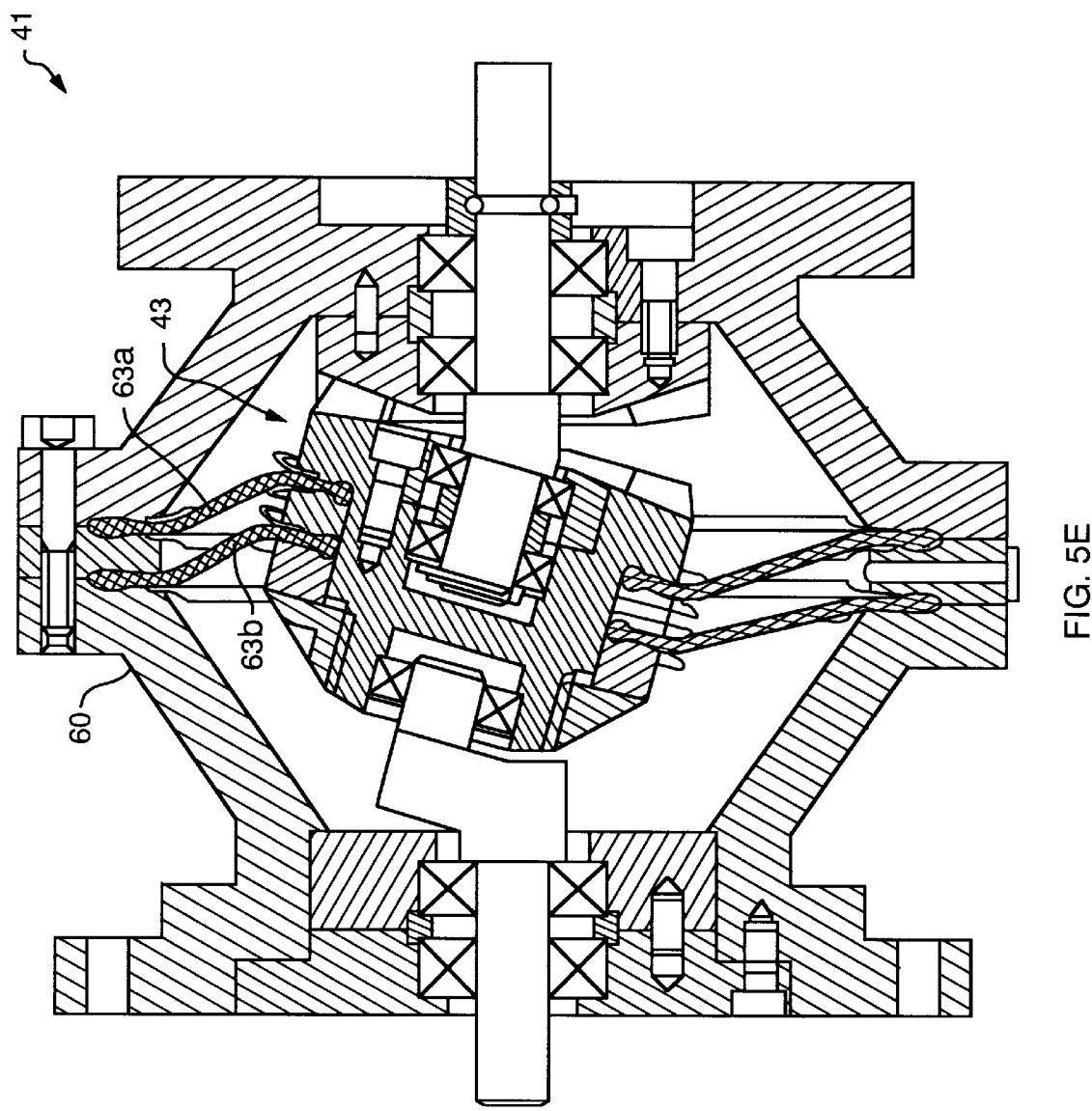

FIGS. 5A–E are side elevational views of the inventive rotary feedthrough 41 showing alternative coupling configurations for the flexible seal 63. In FIG. 5A the flexible seal 63 is sealingly coupled between the collar 43 and the first end plate 45 (as in FIGS. 2–4D), and in FIG. 5B the flexible seal 63 is sealingly coupled between the collar 43 and the housing 60. FIGS. 5C and 5D provide an additional seal to further enhance isolation of the first stage isolation region 65 and remaining area 67. In FIG. 5C a first flexible seal 63a and a second flexible seal 63b are both sealingly coupled (i.e., coupled in parallel) between the first end plate 45 and the collar 43, and in FIG. 5D the first flexible seal 63a is sealingly coupled between the collar 43 and the first end plate 45 and the second flexible seal 63b is sealingly coupled between the collar 43 and the second end plate 47 (i.e., the seals 63a, 63b are coupled serially). FIG. 5E shows an alternative configuration for the rotary feedthrough 41 of FIGS. 5C and 5D wherein both the first flexible seal 63a and the second flexible seal 63b are coupled to the housing 60.

As described previously, during operation the first part 61a and the second part 61b of the anti-rotation element 61 maintain contact with each other, therefore effectively maintaining coupling between the collar 43 and the first end plate 45. The friction between the first part 61a and the second part 61b of the anti-rotation element 61 opposes rotation of the collar 43. Preferably the friction between the first part 61a and the second part 61b equals the rotational forces applied to the collar 43 and therefore completely obstructs rotation of the collar 43. Accordingly, the flexible seal 63 can be made of a less expensive material than is used for conventional rotary feedthrough bellows, reducing the overall cost of the rotary feedthrough. Furthermore, the stress experienced by the flexible seal 63 is reduced, preventing the stress induced failure experienced by the more rigid bellows of conventional rotary feedthroughs.

The foregoing description discloses only the preferred embodiments of the invention, modifications of the above disclosed apparatus and method which fall within the scope of the invention will be readily apparent to those of ordinary skill in the art. For instance, the anti-rotation device of the inventive rotary feedthrough may comprise other configurations, e.g., tapered gears or mechanisms for mated coupling such as interlocking teeth or the like. Further the anti-rotation device may be coupled to locations other than the end plate (e.g., coupled to the side walls of the housing, etc.) and still completely or partially obstruct the collar from rotation. Similarly the specific orientation of the first and second shaft and the collar with respect to one and other, can be altered and still fall within the scope of the invention.

Accordingly, while the present invention has been disclosed in connection with the preferred embodiments thereof, it should be understood that other embodiments may fall within the spirit and scope of the invention, as defined by the following claims.

The invention claimed is:

1. A mechanism adapted to isolatedly transfer motion to an isolated region comprising:
   a collar;
   a first end plate distant to the collar in a first direction;
   a first shaft extending through the first end plate, the first shaft having an angled end extending into and rotatably coupling the collar such that the collar surrounds the angled end of the first shaft;
   a second end plate distant to the collar in a second direction;
   a second shaft extending through the second end plate, the second shaft having an angled end extending into and rotatably coupling the collar such that the collar surrounds the angled end of he second shaft;
   a flexible seal, sealingly coupling the collar and at least one of the first and second end plates; and
   an anti-rotation element engagingly coupled between the collar and the first end plate so as to obstruct rotation of the collar.

2. The apparatus of claim 1 further comprising a housing that extends between the first and second end plates so as to enclose the collar.

3. The apparatus of claim 1 wherein the first shaft is rotatably coupled to the collar via at least one bearing.

4. The apparatus of claim 1 wherein the second shaft is rotatably coupled to the collar via at least one bearing.

5. The apparatus of claim 1 wherein the angled end of the first shaft comprises a first angle so that the collar wobbles when the first shaft is rotated.

6. The apparatus of claim 1 wherein the angled end of the second shaft comprises a second angle.

7. The apparatus of claim 1 wherein the angled end of the first shaft comprises a first angle so that the collar wobbles when the first shaft is rotated; and
   wherein the angled end of the second shaft comprises a second angle so that the second shaft rotates as the collar wobbles.

8. The apparatus of claim 1 wherein the flexible seal comprises a bellows.

9. The apparatus of claim 1 wherein the flexible seal comprises a plurality of bellows.

10. The apparatus of claim 1 wherein the flexible seal comprises a polymer.

11. The apparatus of claim 1 wherein the flexible seal comprises a rubber.

12. The apparatus of claim 1 wherein the flexible seal is non-reactive with hydrogen.

13. The apparatus of claim 1 wherein the flexible seal is coupled between the collar and the housing.

14. The apparatus of claim 1 wherein the anti-rotation element comprises:
   a first part coupled to the collar; and
   a second part coupled to at least one of the first and second end plates.

15. The apparatus of claim 14 wherein at least one of the first and second parts comprises a frictional material.

16. The apparatus of claim 15 wherein the frictional material comprises rubber.

17. A method of transferring motion to an isolated region comprising:
   providing an end plate;
   providing a collar distant to the end plate;
   providing a first shaft extending through the end plate and having a first angled end extending into and rotatably coupled to the collar such that the collar surrounds the first angled end of the first shaft;
   providing a second shaft extending into the isolated region and having a second angled end extending into and rotatably coupled to the collar such that the collar surrounds the second angled end of the second shaft;
   attaching a sealing mechanism between the collar and the end plate so as to create a first stage isolation region;
   engaging the collar with an anti-rotation element so as to obstruct rotation of the collar via the engagement of the collar and the anti-rotation element; and
   rotating the first shaft so as to rotate the collar and the second shaft, wherein at least a portion of the second shaft rotates within the isolated region.

18. A mechanism adapted to isolatedly transfer motion to an isolated region comprising:
   a collar;
   a first end plate distant to the collar in a first direction;
   a first shaft extending through the first end plate, the first shaft extending into and rotatably coupling the collar;
   a second end plate distant to the collar in a second direction;
   a second shaft extending through the second end plate, the second shaft extending into and rotatably coupling the collar;

a flexible seal, sealingly coupling the collar and at least one of the first and second end plates; and an anti-rotation element engagingly coupled between the collar and the first end plate so as to obstruct rotation of the collar, wherein at least one of the first and second shafts comprises an angled end such that the collar surrounds the angled end.

19. The apparatus of claim 18 wherein the first shaft comprises a first angle so that the collar wobbles when the first shaft is rotated; and wherein the second shaft comprises a second angle so that the second shaft rotates as the collar wobbles.

20. A method of transferring motion to an isolated region comprising:

providing an end plate;

providing a collar distant to the end plate;

providing a first shaft extending through the end plate and extending into and rotatably coupled to the collar;

providing a second shaft extending into the isolated region and extending into and rotatably coupled to the collar;

providing at least one of the first and second shafts with an angled end such that the collar surrounds the angled end;

attaching a sealing mechanism between the collar and the end plate so as to create a first stage isolation region;

engaging the collar with an anti-rotation element so as to obstruct rotation of the collar via the engagement of the collar and the anti-rotation element; and rotating the first shaft so as to rotate the collar and the second shaft, wherein at least a portion of the second shaft rotates within the isolated region.

\* \* \* \* \*